F. A. MAGOWAN.
VEHICLE TIRE.
APPLICATION FILED JUNE 2, 1906.
1,053,101.
Patented Feb. 11, 1913.
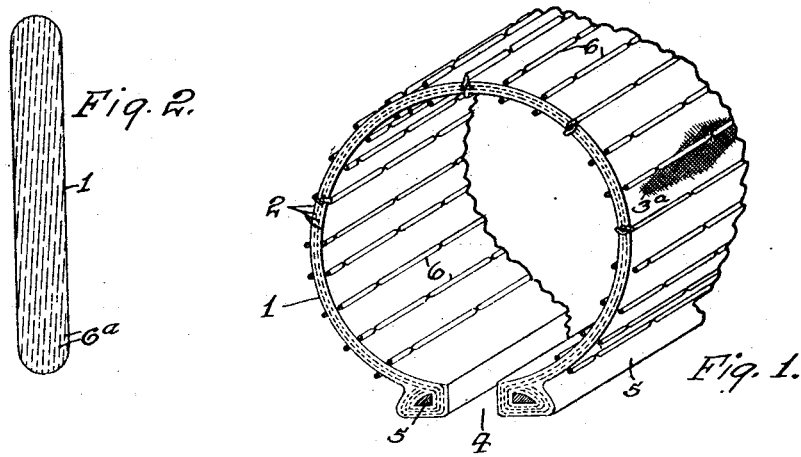
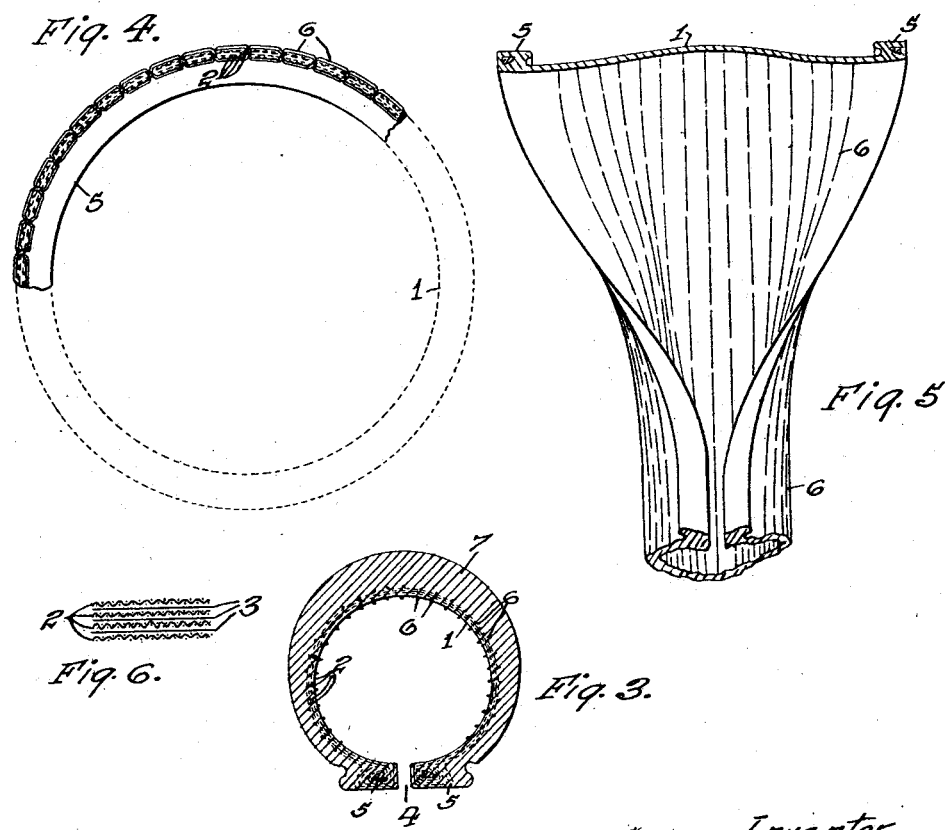

UNITED STATES PATENT OFFICE.

FRANK A. MAGOWAN, OF NEW YORK, N. Y.

VEHICLE-TIRE.

1,053,101. Specification of Letters Patent. Patented Feb. 11, 1913.

Application filed June 2, 1906. Serial No. 319,847.

*To all whom it may concern:*

Be it known that I, FRANK A. MAGOWAN, a citizen of the United States, residing in the borough of Manhattan, New York city, in the county of New York and State of New York, have invented certain new and useful Improvements in Vehicle-Tires, of which the following is a specification.

This invention relates to pneumatic vehicle tires comprising an air tube and a tubular body containing the same.

Owing to the manner in which the body or cover of the tire is constructed, it is subject to longitudinal extension when highly inflated, so that the tire is liable to become too large for the rim, and hence liable to slip off. Moreover, owing to the great excessive lateral kneading and pulling to which the tire is constantly subjected when in use, the plies of rubber forming the body of the tubular cover, are forcibly separated one from another, and this causes a very large portion of the troubles which are experienced by users. It is the practice in making these bodies to employ a high grade of strong cotton duck, and to unite the plies by friction, which vulcanizes them together; but owing to the fact that the duck absorbs a large amount of moisture from the atmosphere and retains the moisture during the construction of the tire, the heat of vulcanization causes the retained moisture to turn into steam which seriously impairs the vulcanization of one ply to another, since the steam forms pockets which prevent the plies from adhering together. It is the practice to minimize this difficulty by first heating the duck to expel the moisture; still an apparently perfect tire will often, after short use, develop unexpected weakness, due to the formation of steam in the duck while vulcanizing.

The objects of my invention are to reduce to a minimum the liability of the tire cover to longitudinal extension by reason of the high compression of air in the tire, and also to enable the cover to withstand for an indefinite length of time the sidewise pulling to which it is constantly subjected in use without suffering any deterioration.

In carrying out my invention, I first form the body of the tire cover, that is the part which is made of cotton duck, by assembling the plies together in the usual manner, each ply being attached to the next by friction. The duck is cut bias, so that its threads run diagonally of the tire. When the tubular body is completed, I take it off from the usual form on which it is made, stitch the plies together by coarse strong thread, twine or copper wire, preferably the latter, the stitches preferably extending in numerous rows longitudinally of the tire, so as to prevent longitudinal extension thereof and consequent increase in diameter when subjected to high internal air pressure in use. I then apply rubber outside of the fabric body, and then vulcanize the whole in the usual manner, the body becoming vulcanized to the rubber, and several plies vulcanized to one another as well as being stitched together. The formation of steam pockets between the duck plies during vulcanization can have no subsequent injurious effect, because the plies cannot separate, the stitches holding them firmly together until the tread of the tire is worn out.

In the accompanying drawings, Figure 1 is a sectional perspective view of a fragment of the body of a detachable tire cover made in accordance with my improvements. Fig. 2 is an edge view of a tire body showing the stitching running helically around the same. Fig. 3 is a transverse section of a completed tire cover. Fig. 4 is a longitudinal section thereof. Fig. 5 illustrates the manner of opening out the body to effect the stitching. Fig. 6 is a diagram illustrating the friction between the plies of duck.

I form a tubular body or foundation 1 for a detachable tire by building the same of numerous plies 2 of cotton duck or other fabric, which are united by cement or "friction" as indicated diagrammatically by lines 3, Fig. 6. The duck is cut on the bias, so that the threads run diagonally around the tire, as indicated at 3ª, Fig. 1. The invention is illustrated as applied to a tire of the detachable type having an opening 4 along its inner or rim side, and flanges 5 along the edges at said opening for securing the tire upon the rim. The body is made upon a suitable form, and is then removed therefrom and stitched, preferably using a sewing machine that forms a lock stitch, so that there is little liability of stretching of the fabric along the lines of the stitches. The stitching is seen at 6, and extends in rows longitudinally of the tire body, that is around the rim of the wheel, and secures or mats all of the plies of duck firmly together. The stitching in this form of tire is done only in that portion of the body between the flanges 5, since it is unnecessary to stitch the flanges themselves. Preferably multiple lines of stitching run helically in a longitudinal direction around the tire, as at 6ª, Fig. 2. It will be understood that the cover may be opened out at the point where the stitching is being done, as at Fig. 5, so that the sewing may conveniently be done upon a sewing machine. After the fabric body is stitched, it is replaced upon the form, and the usual rubber tread or outer wall 7 is applied thereto; and then the whole is vulcanized in a mold or otherwise to form a completed tire cover. By employing copper wire for the stitching, all liability is avoided of deterioration of the stitches by reason of attacks of moisture, and the stitches are not liable to be cut. The copper is flexible, so that it does not unduly stiffen the tire, while it is sufficiently unyielding in longitudinal direction to render the tire substantially inextensible in a direction around the rim of the wheel. Owing to its extreme longitudinal strength the tread portion or crown of the tire body is able itself to withstand the expansive pressure of air within the tire, so that the entire pressure of air in a direction radially of the wheel is not sustained by the sides of the cover, as heretofore, and owing to this reduction of the tendency to burst the sides of the tire, a much greater air pressure may be employed in the tire than customary heretofore. It will be seen that fewer plies than heretofore may be employed, thus relieving the tire of objectionable stiffness, while at the same time the tire will be stronger and more durable.

Having thus described my invention, I claim:

1. As a new article of manufacture, an endless tubular body for a tire cover, said body consisting of several plies of fabric held together by numerous rows of stitching, said rows extending longitudinally of the tire and forming a helix extending around the tire.

2. As a new article of manufacture, an endless tubular body for a tire cover, said body consisting of several plies of fabric whose threads extend diagonally around the tire, said plies stitched together by numerous rows of stitching extending longitudinally of the tire.

FRANK A. MAGOWAN.

Witnesses:
B. C. STICKNEY,
KITTIE FRANKFORT.